July 25, 1950  B. E. FRIER  2,516,198
WHEEL SLIP RELAY AND WIRING
Filed June 18, 1949
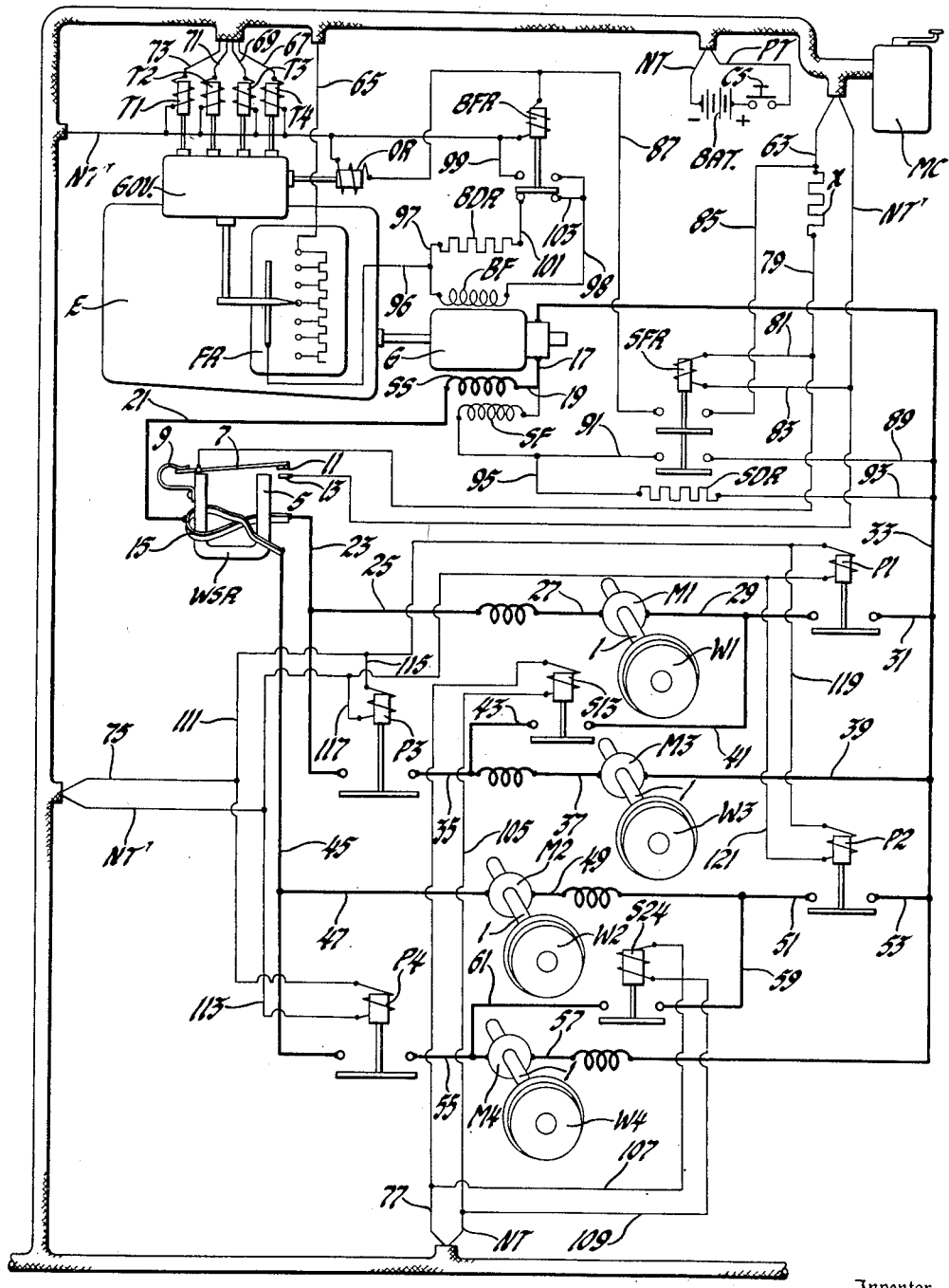
TRAIN LINE CONDUIT
Inventor
Billy E. Frier
By Spencer, Willits, Helwig & Baillio
Attorneys Patented July 25, 1950

2,516,198

UNITED STATES PATENT OFFICE 2,516,198

WHEEL SLIP RELAY AND WIRING

Billy E. Frier, Brookfield, Ill., assignor to General Motors Corporation, Detroit, Mich., a corporation of Delaware Application June 18, 1949, Serial No. 99,960

7 Claims. (Cl. 290—17)

The present invention generally relates to generating electric locomotive traction and control systems and more particularly to anti-wheel slip control means for the traction wheels of locomotives of this type.

The principal object of the present invention is to provide a simple inexpensive traction and control system including a relay associated directly with the power connections and switching means between the locomotive power generating means and traction motors to act upon a slight unbalance in electrical conditions between the motors when connected in either series or series-parallel circuit relation resulting from a slight difference in speed of any motor due to slight slippage of a traction wheel driven by that motor to cause a prompt reduction in the power output of the power generating means to promptly check wheel slippage and restore balanced electrical and speed conditions of the traction motors to the original value at a controlled rate.

The control means and connections by which the above object is accomplished and other novel features of the invention will become apparent by reference to the following detailed description and single schematic drawing illustrating the various control elements and connections of this system which is particularly adapted for a generating electric locomotive.

The traction and control system includes a locomotive power plant including a Diesel engine E operatively connected to a compound electric generator G having series, shunt and battery excited field windings SS, SF and BF and supplying power to series type electric traction motors M1—M2—M3—M4 each operatively connected to separate driving axles I having traction wheels W1, W2, W3, W4 secured thereon.

The power plant is provided with speed, load and output regulating means of conventional type including an engine driven speed responsive governor GOV controlling hydraulic power means operatively connected in conventional manner to the engine fuel regulating means, not shown, and also to a generator field rheostat FR in order to cause operation of the engine and generator power plant at substantially constant speed, load and output in a well known manner. The governor GOV is provided with conventional speed response varying means and electromagnetically controlled speed setting means T1—T2—T3—T4 operatively connected thereto. Electromagnetic governor overriding means OR is operatively connected to the hydraulic power means of the governor GOV to start movement of the field rheo-stat FR toward the maximum resistance position and thereby reduce the generator excitation and power output upon deenergization of the overriding means OR. Reenergization of the overriding means starts movement of the field rheostat FR back to the minimum resistance position to gradually restore the power output of the generator to its original value.

A manually operable master controller MC is provided to control energization of the electromagnetically controlled governor speed setting means T1—T2—T3—T4, the electromagnetically controlled series and parallel switching means S13—S24—P1—P2—P3—P4 for the traction motors and shunt and battery generator field relays SFR—BFR through suitable train-line control conductors, to be described, included in a train-line conduit. These train-line connections are adapted to be connected in multiple with similar train-line connections of other similar locomotive units in conventional manner so that a plurality of locomotive units may be controlled and operated from a master controller MC on any coupled locomotive unit.

The master controller MC is provided with suitable cooperating stationary and manually movable control contacts whereby the shunt field relay SFR is energized to control energization of the battery field relay BFR and the governor speed setting means T1—T2—T3—T4. Controller contacts being provided to control energization of the various governor speed setting means separately and in various combinations to cause operation of the engine and generator power plant under control of the governor at any one of a plurality of constant values of speed, load and output in a well known manner. The master controller MC is also provided with other suitable control contacts to cause energization of either the electromagnetic series switching means S13—S24 or the parallel switching means P1—P2—P3—4 in order to cause transition between a series-parallel and parallel power circuit relation of the traction motors M1—M2—M3—M4 with respect to the power plant generator G by means of power connections, to be described, which are directly associated with a wheel slip control relay WSR so that it responds to slight unbalanced electrical conditions of the motors due to slight differences in traction motor and wheel speeds to cause a reduction in the power supplied the motors by the power plant and thereby promptly check further unbalance and gradually restore balanced electrical and speed conditions of the motors.

The wheel slip relay WSR shown comprises a U-shaped magnetizable yoke 5 having an armature 7 pivoted on one leg and a spring 9 secured thereto and engaging the pivoted end of the armature to normally hold the other end having a contact 11 secured thereto, in spaced relation with the other leg of the yoke and an adjacent stationary contact 13. A single turn winding 15 is shown on one leg of the yoke having a central tap or terminal and opposite end terminals. The generator series field winding SS is connected in series relation between one terminal of the generator armature and the center tap of the winding 15 of the wheel slip relay WSR by power circuit conductors 17, 19 and 21.

Current is supplied by the generator G through separate portions of the winding of the wheel slip relay WSR to separate pairs of traction motors driving separate traction wheels most liable to slip for either forward or reverse operation of the locomotive. For example, in a locomotive having forward and rear two axle trucks, in forward operation the motor M1 drives the leading wheel W1 of the forward locomotive truck and the motor M3 drives the leading wheel W3 of the rear locomotive truck and as weight is transferred from the leading truck wheels W1—W3 to the trailing truck wheels W2—W4 for forward operation the wheels W1—W3 are most likely to slip. For reverse operation the motor M4 drives the leading wheel W4 of the rear truck and the motor M2 drives the leading wheel W2 of the forward truck and the wheels W4 and W2 are most likely to slip for the same reason given above.

The motor M1 and parallel switching means P1 therefor are shown connected in series between one end terminal of the winding 15 of the relay WSR and the opposite generator armature terminal by power circuit conductors 23, 25, 27, 29, 31 and 33. The motor M3 and parallel switching means P3 therefor are shown connected in series between the power conductors 23—33 by power conductors 35, 37 and 39. The series switching means S13 for motors M1—M3 is shown connected by power conductors 41—43 in series relation between the power conductors 29—35. The motor M2 and the parallel switching means P2 therefor are shown connected in series between the other end winding terminal of the relay WSR and power conductor 33 by power conductors 45, 47, 49, 51 and 53. The motor M4 and its parallel switching means P4 are shown connected in series between the power conductors 45—33 by power conductors 55 and 57. The series switching means S24 for the motors M2—M4 is connected in series between power conductors 51—55 by power conductors 59 and 61.

With the motors, series and parallel switching means and separate portions of the single turn winding of the wheel slip relay WSR connected as described above it will be evident that when the windings of the series electromagnetic switching means S13—S24 are energized to cause closure of the contacts thereof the motors M1—M3 are connected in series with half of the winding of the relay WSR and across the generator armature terminals and the motors M2—M4 are connected in series with the other half of the winding of the wheel slip relay WSR and across the generator and therefore in parallel with the motors M1—M3 to establish a series-parallel motor circuit. Providing the speed of each motor and wheel driven thereby is substantially equal the current supplied by the generator will divide equally between each of the parallel connected pairs of motors, each pair being connected in series relation across the generator. As the current flow in each half of the winding 15 of the relay is substantially equal and in opposite direction with respect to relay yoke 5 the yoke remains demagnetized. If, however, any traction wheel slips there will be a slight increase in speed in the motor driving this wheel which causes an unbalance in the back voltage of the motors and an unbalance in current between the two parts of the relay winding causing magnetization of the yoke and attraction of the relay armature 7 which causes closure of the wheel slip relay contacts 11—13.

It will be evident that when the windings of the parallel switching means P1—P2—P3—P4 are energized to cause closure of the contacts thereof the motors M1—M3 will be connected in parallel across the generator with one half of the winding of the wheel slip relay in series with this pair of motors and the other half of the relay winding will be connected in series with the other pair of parallel connected motors M2—M4 to establish a parallel motor circuit.

A control switch CS is shown connected in series between the positive terminal of the battery BAT and the master controller MC by a positive train-line control conductor PT. A negative train-line conductor NT is connected to the negative battery terminal and is shown entering the locomotive train-line conduit and is connected to the master controller and negative train-line branch conductors NT' connected to the negative train-line conductor NT are shown extending from the train line conduit and connected to one winding terminal of each of the above mentioned electromagnetic means. Separate positive train-line control conductors 63, 65, 67, 69, 71, 73, 75 and 77 connected to the master controller MC are shown extending outwardly of the train-line conduit. A resistor X and the normally open contacts 11—13 of the wheel slip relay are connected in series between the positive branch train-line control conductor 63 and a negative train-line control branch conductor NT' by a conductor 79. The winding of the generator shunt field relay SFR is connected by conductors 81—83 between the conductor 79 and a negative train-line branch conductor NT' and therefore in shunt relation with the contacts 11—13 of the wheel slip relay WSR. The upper normally open contacts of the relay SFR are connected in series between the positive train-line control conductor 63 and one winding terminal of the generator battery field relay BFR and the governor overriding means OR by conductors 85—87. The normally open lower contacts of the relay SFR are connected in series relation with the generator shunt field winding SF across the power conductors 17—33 by conductors 89—91 and therefore in shunt relation with the generator armature terminals and a generator shunt field discharge resistor SDR is connected between conductors 33 and 91 by conductors 93—95 and therefore in shunt relation with the lower contacts of the relay SFR having separate armature contacts which bridge the upper and lower contacts of this relay when the winding is energized by movement of the master controller to an operating position in order to cause energization of the windings of the battery field relay BFR and governor overriding means OR and the generator shunt field winding SF. This causes the closure of the upper pair of contacts of the battery field relay and the opening of the lower contacts by movement of the armature contact and movement of the plunger of the governor overriding means to cause operation of the generator field rheostat FR by the hydraulic means of the governor GOV. The field rheostat FR, generator battery field winding BF and upper contacts of the relay BFR are connected in series between the positive train-line conductor 65 and a negative train-line branch conductor NT' by conductors 96, 97, 98 and 99 and upon closure of these contacts the battery field winding is energized, the excitation current therein then being controlled by the field rheostat. The lower contacts of the relay BFR and a battery field discharge resistor BDR are connected in series across the battery field winding between conductors 97—98 by conductors 101—103. It will be evident that upon energization and closure of the upper contacts of the relay SFR the battery field relay winding is energized to cause closure of the upper contacts and the opening of the lower contacts. This causes energization of the generator battery field winding BF through the field rheostat FR and conductors 65—96—98—99—NT'.

The windings of the series switching means S13—S24 are connected in parallel with the positive and negative train-line conductors 77—NT' by conductors 105, 107 and 109 and these windings are energized to establish the series-parallel motor-power circuit relation with the generator G when the master controller MC is moved to one controlling condition.

The windings of the parallel switching means P1—P2—P3—P4 are connected in parallel with the positive and negative train-line conductors 75—NT' by conductors 111, 113, 115, 117, 119 and 121 and these windings are energized upon movement of the master controller to a parallel control position to establish the parallel motor power circuit relation with the generator G.

As explained with the master controller MC moved to an operative position the governor GOV causes the power plant to supply substantially constant value of power to the traction motors when connected in either the series or parallel circuit relation as determined by the controlling position of the master controller. As each pair of series or parallel connected motors are connected in series with each half turn of the wheel slip relay winding 15 when the motors are connected in either the series parallel or parallel circuit relation with the generator G if there is no difference in speed of the traction wheels and motors driving these wheels substantially equal values of load current flows in each half of the single turn winding 15 of the wheel slip relay WSR in opposite directions around one leg of the relay yoke 5 and it is demagnetized and the relay contacts 11—13 are open. Should any wheel driven by a motor slip on the rail the speed of this motor and its back voltage will increase thereby decreasing the current flow in one half of the wheel slip relay winding relative to the flow in the other half of the winding in the opposite direction and cause excitation of the relay yoke and closure of the relay contacts 11—13. This shunts the winding of the shunt field relay SFR and causes opening of the upper and lower contacts. Opening of the lower contacts inserts the shunt field discharge resistor SDR in series with the shunt field winding SF and causes prompt delay of flux in this field and a corresponding reduction in the generator power output to the motors. Opening of the upper contacts of the relay SFR causes deenergization of the windings of the battery field relay BFR and governor overriding device OR. The opening of the upper contacts of the battery field relay deenergizes the generator battery field winding BF and closure of the lower relay contacts connects the battery field discharge resistor BDR in shunt relation with the battery field winding BF likewise causing a prompt decay of flux in this field and the generator power output is accordingly reduced to a low value and wheel slippage is promptly checked. At the same time deenergization of the governor overriding means OR occurs to cause the hydraulic power means of the governor GOV to move the movable element of the field rheostat FR in the battery field circuit to its maximum resistance position. Checking of wheel slippage restores balanced wheel and motor speed conditions and current values in each half of the winding of the wheel slip relay and the relay contacts open to reenergize the windings of generator and battery field relay and the overriding device. This causes reexcitation of the generator shunt and battery field windings SF and BF. The excitation current in battery field winding BF is at the minimum value due to the fact that the overriding device OR when deenergized causes the movable element of the field rheostat to move to the maximum resistance position. This causes a resumption of power from the generator at a reduced value to its original value thereby preventing further wheel slip, the power increasing to the original value gradually upon reenergization of the governor overriding means OR which causes the movable element of the field rheostat FR to move back to its original position to increase the excitation current in the generator battery field to its original value so that the power output to the motors gradually increases to the value present prior to wheel slippage.

The operation is the same whether the motors are connected in series-parallel or parallel with the generator due to the arrangement of the split winding of the wheel slip relay WSR in the generator and motor power circuit connections. The wheel slip relay structure is simple and inexpensive and sensitive to slight differences in load current in each half of this winding and promptly checks wheel slip and gradually restores balanced speed and current conditions to prevent further slippage due to being associated directly with the power conductors in the manner described and giving adequate protection against wheel slippage when the motors are connected in either a series or a parallel circuit relation with the generator for either forward or backward operation of the locomotive.

I claim:

1. In a traction and control system for a multi-traction wheel vehicle, an electric traction motor driving each wheel, a generating electric power plant having power output regulating means, a relay for controlling the output regulating means to cause a reduction in the output of the power plant, said relay having a winding provided with an intermediate tap and operable upon unbalanced electrical conditions in each portion of the winding, power circuit conductors including series and parallel switching means for connecting equal numbers of motors in separate series or parallel connected groups and in series with each portion of the relay winding across the power plant to cause the relay to act upon a difference in speed and electrical conditions in any motor of either series or parallel connected group to reduce the power output supplied the motors and restore balanced speed and electrical conditions between the motors of both groups.

2. In a traction and control system for a multi-traction wheel vehicle, an electric traction motor driving each motor, a generating electric power plant including output regulating means, a relay connected in controlling relation with the regulating means to cause a reduction in the power plant output, said relay having a single turn current winding provided with a center tap and operable upon unbalanced current conditions in each winding portion, separate motor power circuits supplied by the power plant, each motor power circuit including a portion of the relay current winding, equal numbers of traction motors and series and parallel switching means for connecting the motors in each circuit in series or parallel power circuit relation so that upon the occurrence of unbalanced electrical conditions in the motor power circuits the relay acts to cause a reduction in power output to the motors to restore balanced electrical conditions therein.

3. In a traction and control system for a multi-traction wheel locomotive, an electric traction motor driving pairs of traction wheels, a generating electric power plant having fast and slow acting power output regulating means, a relay acting to control simultaneous operation of said fast and slow acting power output regulating means, said relay having an electromagnetic winding provided with an intermediate tap and acting only upon unbalanced electrical conditions in the two portions of the winding either side of the intermediate tap, separate motor power circuits connecting across the power plant, each motor circuit including one portion of the relay winding, equal numbers of traction motors and series and parallel switching means for connecting the motors in each circuit in series or parallel circuit relation and for rendering the relay responsive to unbalanced motor speed and electrical conditions between the separate circuits to cause a prompt reduction in the power supplied the motors to restore balanced speed conditions and for causing a gradual increase in power in these circuits to the original value.

4. In a traction and control system for a multi-traction wheel locomotive, a plurality of electric traction motors driving separate traction wheels, a generating electric power plant having power output regulating means, manual and automatic control means for the regulating means, said manually operable means normally controlling said regulating means and said automatic means comprising a relay having a current winding provided with an intermediate tap and operable upon unbalanced current conditions in the two portions of the winding to render the manual control means inoperative and cause a reduction in the output of the power plant, separate motor power circuits connected to the power plant each motor circuit including one portion of the relay winding, equal numbers of traction motors and series and parallel switching means for connecting the motors in series or parallel circuit relation and to render said relay responsive to unbalanced current conditions in the separate motor circuits resulting from slippage of any wheel driven by any motor and thereby promptly reduce the power output applied by the power plant to the motors to check wheel slippage and re-establish balanced current conditions and normal power output in the separate motor circuits.

5. In a traction and control system for a multi-traction wheel locomotive, a plurality of electric traction motors driving separate traction wheels, a generating electric power plant including interconnected fast and slow acting output varying means, a manual controller operable to control said output regulating means, a relay connected to said manual controller, said relay having an actuating winding provided with a center tap and operable upon unbalanced electrical conditions in two parts of the winding to render the manual controller inoperative to control said output regulating means and thereby cause a fast reduction in the power output of the power plant, separate motor power circuits connected to the power plant, each power circuit including the same number of traction motors, one portion of the relay winding and series and parallel switching means controlled by the manual controller for connecting the motors in series and parallel circuit relation and to render said relay responsive to unbalanced current conditions in the separate motor circuits resulting from slippage of any motor driven traction wheel and thereby cause a fast reduction in power output of the power plant to the motors to promptly check wheel slippage and restore balanced electrical conditions in the motor circuits and relay winding portions and thereby render the controller and fast and slow acting output regulating means operative to cause a slow increase in the output of the power plant to its original value.

6. In a traction and control system for a multi-traction wheel locomotive, electric traction motors driving separate traction wheels, a generating electric power plant including an internal combustion engine, an electric generator driven thereby, said generator having an excitation field circuit including excitation current varying means to vary the generator output and excitation switching means for exciting the field circuit and for discharging the field circuit in order to obtain a prompt reduction in generator excitation and power output, a speed responsive governor having speed response setting means driven by the power plant and operable to control the fuel supplied the engine and generator excitation current varying means to cause operation of the power plant at any one of a plurality of constant values of speed, load and power output corresponding to the setting of the governor speed response setting means, governor overriding means operably connected with the excitation switching means and operable upon discharge of the excitation circuit to position the excitation varying means to a reduced excitation current controlling position prior to re-excitation, separate traction motor connections, each including a like number of motors and series and parallel switching means for connecting the motors in series or parallel relation, a manually operable controller controlling said governor speed setting means, excitation switching means and motor series and parallel switching means, and a wheel slip relay connected in controlling relation between said controller and said excitation switching means, said relay having an actuating winding provided with a center tap and each of the end portions of the relay winding being connected in series relation between the generator and each motor circuit so that the wheel slip relay acts only upon the occurrence of any unbalance in current conditions in the motor circuits due to slippage of any motor driven wheel to cause a prompt discharge of the generator excitation circuit and a prompt reduction in power output to the motors and also movement of the excitation varying means to the reduced excitation controlling position and thereby promptly check wheel slip and restore balanced motor speed current conditions and motor conditions in the motor circuits and winding portions of the relay and to cause re-excitation of the generator and the return of the excitation current varying means by the governor to its original value thereby causing an increase in the generator output to the motors to the original value prior to wheel slippage to prevent a reoccurrence thereof.

7. In a traction and control system for a multi-traction wheel locomotive, electric traction motors driving separate traction wheels, separate traction motor power circuits each including the same number of motors and electrically controlled series and parallel switching means for connecting the motors in series and parallel relation, a Diesel engine, an electric generator driven thereby, said generator having an excitation circuit including a rheostat for varying the excitation current and electrically controlled switching means for completing and discharging the excitation circuit, a governor having electrically controlled speed response varying means and acting in response to the speed of said engine for controlling the engine fuel and said rheostat to cause operation of said engine and generator at any one of a plurality of substantially constant values of speed, load and output, electrically controlled governor overriding means for causing movement of the rheostat to reduce the excitation current and power output of the generator, a manually operable master controller, train-line control conductors interconnecting the controller to the various electrically controlled means for control thereof and adapted to be connected in multiple with other train-line and control conductors and similar electrically controlled means on other locomotives for multiple control thereof, a wheel slip relay having a single current actuating winding provided with a center tap and having each of the two winding portions thereof connected in series between the generator and one of the motor circuit connections to act in response to unbalanced current conditions in the motor circuits resulting from slippage of any motor driven traction wheel, said relay having control contacts connected in the train-line control connections between said controller and said electrically operated excitation switching means and governor overriding means to cause prompt discharge of the generator excitation circuit and movement of the rheostat therein to the reduced current controlling position upon action of the relay thereby causing a prompt reduction of the generator output to promptly check further wheel slippage and restore balanced current conditions in the motor circuits, re-excitation and movement of the rheostat to the original controlling position to cause an increase in the power output to the motors to inhibit further wheel slippage.

BILLY E. FRIER.

REFERENCES CITED

The following references are of record in the file of this patent:

UNITED STATES PATENTS

| Number | Name | Date |
| --- | --- | --- |
| Re. 22,588 | Kew | Jan. 9, 1945 |
| 2,266,326 | Lillquist | Dec. 16, 1941 |
| 2,449,399 | Lillquist | Sept. 14, 1948 |